United States Patent
Nambu et al.

(10) Patent No.: US 7,668,909 B2
(45) Date of Patent: Feb. 23, 2010

(54) BULLETIN BOARD MANAGEMENT SYSTEM AND COMPUTER PROGRAM

(75) Inventors: Hiroyuki Nambu, Kawasaki (JP); Satomi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 883 days.

(21) Appl. No.: 10/954,198

(22) Filed: Oct. 1, 2004

(65) Prior Publication Data

US 2005/0265101 A1 Dec. 1, 2005

Related U.S. Application Data

(63) Continuation of application No. PCT/JP02/03276, filed on Apr. 1, 2002.

(51) Int. Cl.
*G06F 15/16* (2006.01)
(52) U.S. Cl. .................................. 709/204
(58) Field of Classification Search ................ 709/204
See application file for complete search history.

(56) References Cited

U.S. PATENT DOCUMENTS

| | | | |
|---|---|---|---|
| 5,764,898 A * | 6/1998 | Tsuji et al. ................. 709/206 |
| 6,222,535 B1 * | 4/2001 | Hurd, II ..................... 709/205 |
| 6,230,185 B1 * | 5/2001 | Salas et al. ................. 709/205 |
| 6,327,046 B1 * | 12/2001 | Miyamoto et al. .......... 709/206 |
| 6,490,583 B2 * | 12/2002 | Tada et al. ..................... 707/9 |
| 6,557,027 B1 * | 4/2003 | Cragun ....................... 709/204 |
| 2002/0112006 A1 | 8/2002 | Kuriki et al. |
| 2003/0009385 A1 * | 1/2003 | Tucciarone et al. ......... 709/206 |
| 2003/0097361 A1 * | 5/2003 | Huang et al. ................. 707/10 |

FOREIGN PATENT DOCUMENTS

| | | |
|---|---|---|
| JP | 6-14140 | 1/1994 |
| JP | 6-67630 | 3/1994 |
| JP | 7-38602 | 2/1995 |
| JP | 8-163160 | 6/1996 |
| JP | 9-218841 | 8/1997 |
| JP | 9-331353 | 12/1997 |
| JP | 10-171700 | 6/1998 |
| JP | 11-3300 | 1/1999 |
| JP | 11-306098 | 11/1999 |
| JP | 2000-29798 | 1/2000 |
| JP | 2000-293456 | 10/2000 |
| JP | 2001-265903 | 9/2001 |
| JP | 2001-290977 | 10/2001 |
| JP | 2001-312575 | 11/2001 |
| JP | 2002-32552 | 1/2002 |

* cited by examiner

*Primary Examiner*—Benjamin R Bruckart
(74) *Attorney, Agent, or Firm*—Staas & Halsey LLP

(57) ABSTRACT

A site for communication and information sharing among members is provided by a bulletin board management system utilizing a computer network. When a change is made to contents of bulletin information, the system determines members who have already read the bulletin information before the change based on a result of monitoring. The system automatically sends an electronic mail urging these members to check the change in contents of the bulletin information and changes the status of these members from "already read" to "required to check the change." Thus, the electronic mail urging members to check the change in contents is sent only to members who need to check, so failure of information transmission is prevented and information can be communicated to all members securely.

12 Claims, 16 Drawing Sheets

| BULLETIN NO. | MEMBERS TO BE PROVIDED | REPLY | READ STATE |
|---|---|---|---|
| 1 | 01 | | UNREAD |
| | 05 | ANSWERED | ALREADY READ |
| | 10 | TO BE ANSWERED | ALREADY READ |
| 2 | 02 | | ALREADY READ |
| | 10 | | UNREAD |

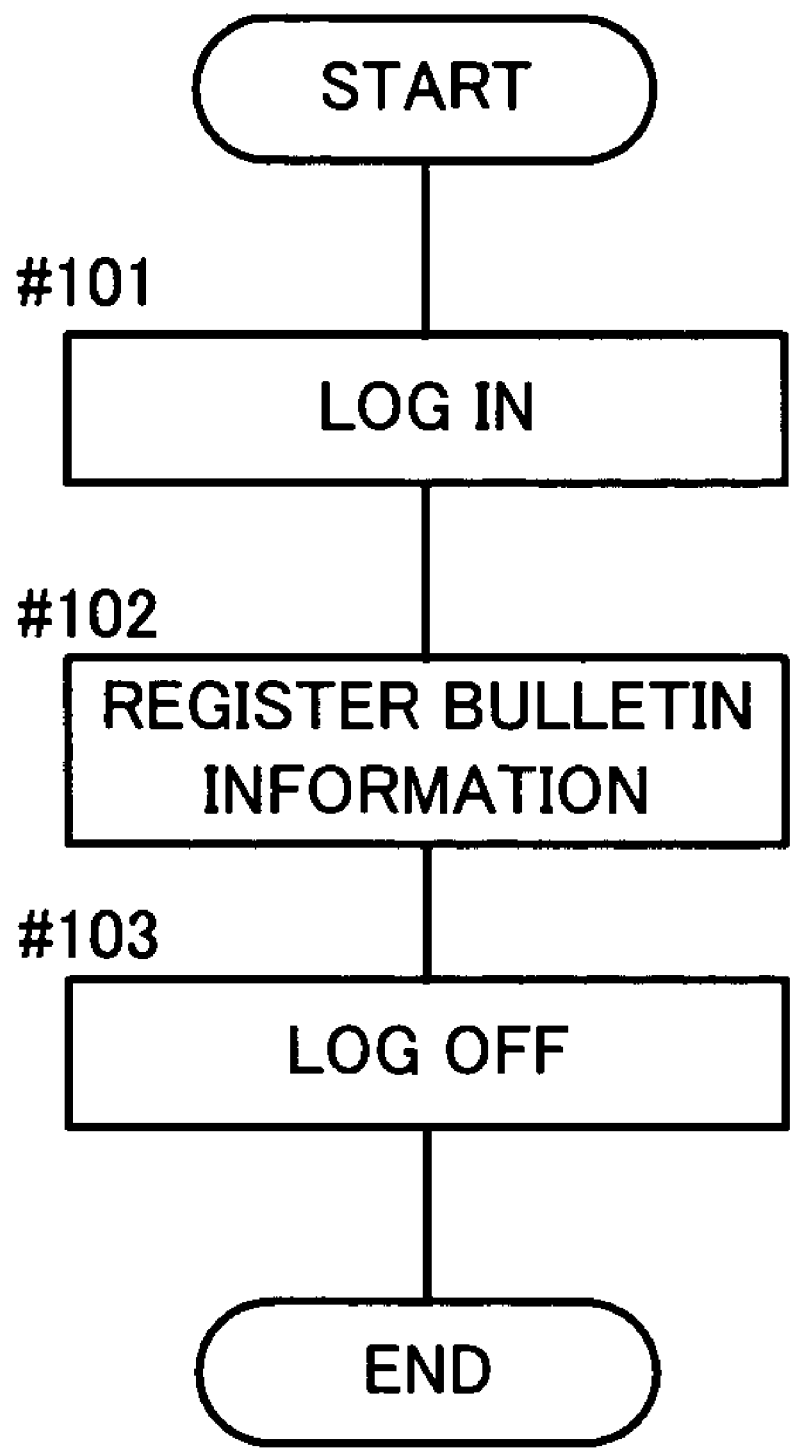

FIG. 4(a)

TITLE: CREDIT FOR ACQUISITION OF DWELLING HOUSE
ITEMS OF REPLY: ANSWERED, NOT TO BE ANSWERED
CONTENTS: SYSTEM DEADLINE IS XXXX, XX . PLEASE SEND ATTACHED DOCUMENTS TO ADMINISTRATION DEPARTMENT BY INTER-OFFICE MAIL AFTER ISSUING A FORM BY THE SYSTEM.
ATTACHED DOCUMENTS: SYSTEM PRINT SLIP, YEAR-END BALANCE STATEMENT, CERTIFICATE ISSUED BY TAX OFFICE
RESTRICTION OF DISCLOSURE: ●YES  ○NO
EXPIRATION DATE: XXXX.XX .
EXTENSION OF EXPIRATION DATE: ○NO  ○AUTOMATIC EXTENSION  ○RESETTING
RELATED FILES: NO
RELATED HOME PAGES : http://www.soumu.fujitsu.co.jp/news0000.htm

FIG. 4(b)

SCREEN FOR SELECTING MEMBERS TO BE PROVIDED WITH INFORMATION

☑ EXECUTIVE GROUP
    ☑ A DEPARTMENT MANAGER    ☑ B SECTION MANAGER

☐ COMMON TECHNIQUE GROUP
    ☑ C    ☐ D    ☐ E

☐ MANAGEMENT SERVICE GROUP
    ☐ F    ☑ G    ☐ H

☐ MANAGEMENT GROUP
    ☐ I    ☐ J    ☐ K

FIG. 6(a)

| BULLETIN NO. | MEMBERS TO BE PROVIDED | REPLY | READ STATE |
|---|---|---|---|
| 1 | 01<br>05<br>10 | <br>ANSWERED<br>TO BE ANSWERED | UNREAD<br>ALREADY READ<br>ALREADY READ |
| 2 | 02<br>10 | | ALREADY READ<br>UNREAD |

FIG. 6(b)

| BULLETIN NO. | MEMBERS TO BE PROVIDED | REPLY | READ STATE |
|---|---|---|---|
| 1 | 01<br>05<br>10 | <br>ANSWERED<br>TO BE ANSWERED | UNREAD<br>REQUIRED TO CHECK THE CHANGE<br>REQUIRED TO CHECK THE CHANGE |
| 2 | 02<br>10 | | ALREADY READ<br>UNREAD |

FIG. 6(c)

| BULLETIN NO. | MEMBERS TO BE PROVIDED | REPLY | READ STATE |
|---|---|---|---|
| 1 | 01<br>05<br>10 | | UNREAD<br>REQUIRED TO CHECK THE CHANGE<br>REQUIRED TO CHECK THE CHANGE |
| 2 | 02<br>10 | ALREADY SAW | ALREADY READ<br>UNREAD |

FIG. 6(d)

05: DEAR Mr./Mrs. BBB
A CHANGE WAS MADE TO BULLETIN

10: DEAR Mr./Mrs. AAA
  A CHANGE WAS MADE TO BULLETIN INFORMATION ON BULLETIN BOARD.
  RE: □□□

FIG. 10(a)

```
┌─────────────────────────────────────────────────────────────────┐
│ 🔑 CREDIT FOR ACQUISITION OF DWELLING HOUSE AAA: NOV.△ 16:30    │
├─────────────────────────────────────────────────────────────────┤
│ SYSTEM DEADLINE IS XXXX, XX. PLEASE SEND ATTACHED               │
│ DOCUMENTS TO ADMINISTRATION DEPARTMENT BY INTER-                │
│ OFFICE MAIL AFTER ISSUING A FORM BY THE SYSTEM.                 │
│ ┌──────────┐                                                    │
│ │DOCUMENTS │ SYSTEM PRINT SLIP, YEAR-END BALANCE STATEMENT,     │
│ │TO BE SENT│ CERTIFICATE ISSUED BY TAX OFFICE                   │
│ └──────────┘                                                    │
│ RELATED HOME PAGES: http://www.soumu.fujitsu.co.jp/news0000.htm │
│ ─────────────────────────────────────────────────────────────── │
│        ┌──────────┐    ┌──────────────┐                         │
│        │ ANSWERED │    │   TO BE      │                         │
│        │          │    │ UNANSWERED   │                         │
│        └──────────┘    └──────────────┘                         │
│              33                     34                          │
│        ANSWERED: 1 PERSON                                       │
│        TO BE UNANSWERED : 2 PERSONS                             │
│     35  UNREAD : 5 PERSONS                                      │
└─────────────────────────────────────────────────────────────────┘
```

- 32 (outer frame)
- 33 ANSWERED
- 34 TO BE UNANSWERED
- 35

FIG. 10(b)

| ANSWER STATE | | |
|---|---|---|
| ANSWERED | A SECTION MANAGER (2001/11/18) | 1 PERSON |
| TO BE UNANSWERED | C(2001/11/19), E(2001/11/20) | 2 PERSONS |
| UNREAD | B DEPARTMENT MANAGER, D, F, G, H | 5 PERSONS |

FIG. 11

> 🔑 CREDIT FOR ACQUISITION OF DWELLING HOUSE AAA : NOV. △ 16 : 30
>
> SYSTEM DEADLINE IS XXXX, XX . PLEASE SEND ATTACHED DOCUMENTS TO ADMINISTRATION DEPARTMENT BY INTER-OFFICE MAIL AFTER ISSUING A FORM BY THE SYSTEM.
>
> | DOCUMENTS TO BE SENT | SYSTEM PRINT SLIP, YEAR-END BALANCE STATEMENT, CERTIFICATE ISSUED BY TAX OFFICE |
>
> RELATED HOME PAGES : http://www.soumu.fujitsu.co.jp/news0000.htm
>
> ---
>
> ANSWERED : 1 PERSON
> TO BE UNANSWERED : 2 PERSONS
> UNREAD : 5PERSONS

FIG. 12

> DEAR MR. /MRS. AAA
>
> THIS IS TO INFORM YOU THAT ANSWERS ARE COMPLETED FOR YOUR REGISTERED BULLETIN INFORMATION.
>
> CONTENTS :
>
> ANSWER STATE :

FIG. 13(a)

> 🔑 CREDIT FOR ACQUISITION OF DWELLING HOUSE AAA : NOV.△ 16:30
>
> SYSTEM DEADLINE IS XXXX, XX . PLEASE SEND ATTACHED DOCUMENTS TO ADMINISTRATION DEPARTMENT BY INTER-OFFICE MAIL AFTER ISSUING A FORM BY THE SYSTEM.
>
> | DOCUMENTS TO BE SENT | SYSTEM PRINT SLIP, YEAR-END BALANCE STATEMENT, CERTIFICATE ISSUED BY TAX OFFICE |
>
> RELATED HOME PAGES : http://www.soumu.fujitsu.co.jp/news0000.htm
>
> ----
>
> [ ANSWERED ]   [ TO BE UNANSWERED ]
>
> ANSWERED : 1 PERSON
> TO BE UNANSWERED : 6 PERSONS
> UNREAD : NONE
> REQUIRED TO RECONFIRM : 1 PERSON

FIG. 13(b)

| ANSWER STATE | | |
|---|---|---|
| ANSWERED | A SECTION MANAGER (2001/11/18) | 1 PERSON |
| TO BE UNANSWERED | C(2001/11/19), E(2001/11/20) D(2001/11/20), F(2001/11/20), G(2001/11/20), H(2001/11/20) | 6 PERSONS |
| UNREAD | B DEPARTMENT MANAGER | 1 PERSON |

NOTICE DESTINATION EXTRACTION TABLE

| ID | UNANSWERED | CHECKED THE CHANGE | SUM | REMINDER |
|---|---|---|---|---|
| 01 | 1 | 0 | 1 | 0 |
| 05 | 0 | 1 | 1 | 0 |
| 10 | 1 | 1 | 2 | 1 |

FIG. 15(a)

MEMBER MANAGEMENT TABLE

```
01: A SECTION MANAGER: aaa
02: B SECTION MANAGER: bbb
03: C: ccc
04: D: ddd
05: E: eee
06: F: fff
```

FIG. 15(b)

STATUS MANAGEMENT TABLE

| BULLETIN NO. | MEMBERS TO BE PROVIDED | READ STATE |
|---|---|---|
| 1 | 01 | UNREAD |
|  | 05 | REQUIRED TO CHECK THE CHANGE |
|  | 10 | REQUIRED TO CHECK THE CHANGE |
| 2 | 02 | ALREADY READ |
|  | 10 | UNREAD |

FIG. 15(c)

BULLETIN INFORMATION MANAGEMENT TABLE

| No. | INFORMATION SENDER | LAST UPDATED DATE | EXPIRATION DATE | COMPLETION DATE |
|---|---|---|---|---|
| 1 | 02 | 2001.11.04 | 2001.11.20 |  |
| 2 | 01 | 2001.11.05 | 2001.11.20 |  |
|  |  |  |  |  |

FIG. 15(d)

ANSWER STATE EXTRACTED TABLE

| ID | UNANSWERED | CHECKED THE CHANGE | SUM | REMINDER |
|---|---|---|---|---|
| 01 | 1 | 0 | 1 | 0 |
| 02 | 0 | 0 | 0 | 0 |
| 03 | 0 | 0 | 0 | 0 |
| 04 | 0 | 0 | 0 | 0 |
| 05 | 0 | 1 | 1 | 0 |
| 10 | 1 | 1 | 2 | 1 |

FIG. 18(a)
STATUS MANAGEMENT TABLE

| BULLETIN NO. | MEMBERS TO BE PROVIDED | READ STATE |
|---|---|---|
| 1 | 01 | UNREAD |
|   | 05 | REQUIRED TO CHECK THE CHANGE |
|   | 10 | REQUIRED TO CHECK THE CHANGE |
| 2 | 02 | ALREADY READ |
|   | 10 | ALREADY READ |

FIG. 18(b)
BULLETIN INFORMATION MANAGEMENT TABLE

| No. | INFORMATION SENDER | EXPIRATION DATE | COMPLETION DATE |
|---|---|---|---|
| 1 | 02 | 2001.11.20 |  |
| 2 | 01 | 2001.11.20 | 2001.11.15 |
|  |  |  |  |

FIG. 18(c)
ANSWER STATE EXTRACTED TABLE

| ID | UNANSWERED | CHECKED THE CHANGE | SUM | REMINDER |
|---|---|---|---|---|
| 01 | 1 | 2 | 3 | * |

FIG. 18(d)
NOTICE DESTINATION EXTRACTION TABLE

| ID | UNANSWERED | CHECKED THE CHANGE | SUM | REMINDER | INFORMATION SENDER ID |
|---|---|---|---|---|---|
| 01 | 1 | 2 | 3 | * | 02 |
|  |  |  |  |  |  |
|  |  |  |  |  |  |

FIG. 18(e)

DEAR MR. / MRS. AAA
  THE FOLLOWING IS AN ANSWER (READ) STATE OF YOUR REGISTERED INFORMATION. XXXX,XX .
  RE : XXXXXXXXX
  EXPIRATION DATE : XXXX,XX .
  PERSON WHO HAS NOT READ YET : AA DEPARTMENT MANAGER AND MR. A (TTL 2 PERSONS)
IF MEASURE FOR EXPIRATION DATE EXTENSION IS NEEDED, PLEASE TAKE MEASURES.

BULLETIN BOARD MANAGEMENT SYSTEM AND COMPUTER PROGRAM

This application is a continuing application, filed under 35 U.S.C. §111 (a), of International Application PCT/JP02/03276, filed Apr 1, 2002.

TECHNICAL FIELD

This invention relates to a bulletin board management system for providing a site for communication and information sharing among members by utilizing a computer network and a computer program for realizing the system.

BACKGROUND ART

An electronic bulletin board (also referred to as a bulletin board simply), which is provided in a storage device of a server constituting a computer network, is widely used as a site where users of terminal devices (clients) can read and write information freely. Such electronic bulletin boards are on public view and are read or written by any unnamed person as a general rule, but it is also common to provide a forum or the like to which only registered members can get access by an authentication procedure such as log-in.

Such electronic bulletin boards are used for providing sites for communication and information sharing among members belonging to a specific group. Compared with mailing list or broadcasting transmission by using electronic mail only, the electronic bulletin board has a merit that information sharing among members can be achieved in real time.

In a conventional electronic bulletin board, a notice mail is sent to members who did not read specific information so as to encourage them to read the information and to prevent failure of information transmission. However, a sender of the information may be required to decide whether the bulletin information should be finished or not depending on level of importance of the information or others when an expiration date of the bulletin information has come and there is still a member who has not read the information yet. In some cases, the expiration date should be postponed so that the information can be shared by every member.

In addition, if a change is made in the bulletin information (text and related data), individual communication to each member by electronic mail or telephone may be necessary so that the information sender can check whether the change is transmitted to each member correctly. For this case, a method is proposed in which a notice of the change is automatically transmitted to designated addresses (see Japanese unexamined patent publication No. 6-14140). In this method, however, the notice of the change is sent to every member to be provided with the information without checking whether the member has read the information or not. In addition, an operation may be performed in which the revised bulletin information is put up as new bulletin information, or statuses of all members to be provided with the information including members who have already read the information are reset to "not read".

Furthermore, a method is generally used in which the information is provided to not all members but members who satisfy a predetermined condition, so only the members designated by the information sender can read the information. In this case, the reader can know that the information is restricted to specific members but cannot know the specific range of members who can read the information.

It is very hard to manage manually the above-mentioned expiration date of bulletin information or read and unread statuses for every member to be provided with the information. If the management is not performed appropriately, a problem may happen such that the expiration date of important bulletin information is not postponed though there is a member who has not read it yet, resulting in that the important information is not shared by all the members.

In addition, many problems may happen when the bulletin information is revised. First, if the notice of the change is sent not only to members who have not read the information but also to members who have already read the information, it may permit waste in operations or inundation of unnecessary information, because the notice of the change is sent to members who have not read the information and do not need the information. Secondly, if only resetting the statuses of read or unread of every member to "unread" when the bulletin information is revised, there is a possibility of overlooking the bulletin information after the revision by a member who has read the information before the revision because he or she may misunderstand the bulletin information as already read when viewing it without any motivation to confirm contents of the revision. Thirdly, if the status is still "read" after the notice of the change is sent, there is no means for checking whether contents of the revision was confirmed or not, so that members may have different recognitions about the information.

Furthermore, if the range of the members who are provided with information is restricted, a reader can know that the information is restricted to specific members but cannot know the specific range of members who can read the information. In addition, the reader cannot know the situation about the members who have read or not read the information in real time. For this reason, prompt decision and action cannot be achieved by the communication in the information sharing range. There is a possibility of leaking information to a person who is not member to be provided with the information due to a delusion or a presumption of a reader of the information, for example. On the contrary, if such a leakage of information is cared too much, there is a possibility of insufficient communication and share of information among members in a working place or the like by utilizing a bulletin board management system.

The present invention is made to solve the above problem, and an object of the present invention is to provide a bulletin board management system and a computer program for realizing the system, in which failure of information transmission is prevented effectively, so that promotion of communication among members and prevention of information leakage can be achieved by small effort of management.

DISCLOSURE OF THE INVENTION

A bulletin board management system according to the present invention is for providing a site for communication and information sharing among members by utilizing a computer network. The system includes an information registration portion for an information sender to register bulletin information and designating information including members to be provided with the information, choices of answer and an expiration date, an information changing portion for making a change to contents of the bulletin information registered by the information sender, an information list display portion for extracting bulletin information and displaying a list thereof by a terminal device of a member who logged in, the extracted bulletin information being designated to be provided to the member, a read state monitoring portion for monitoring a read state and an answer state of the bulletin information and members, a reminding portion for sending automatically a notice by electronic mail to a member who has not answered the bulletin information yet in accordance with the answer state of each member obtained by the read state monitoring portion, and an expiration date extension confirmation portion for sending automatically an electronic mail urging the information sender to postpone the expiration date if there is a member who has not answered the bulletin information whose expiration date is coming soon.

According to this structure, failure of information transmission is prevented effectively, so that promotion of communication among members and prevention of information leakage can be achieved by small effort of management.

In a preferred embodiment, when a change is made to contents of bulletin information, the information changing portion extracts members who have already read the bulletin information before the change from a result of monitoring by the read state monitoring portion so as to send automatically an electronic mail urging the extracted members to check the change in contents of the bulletin information, and changes statuses of the extracted members indicating "already read" to statuses indicating "required to check the change". Thus, the electronic mail for urging to check the change in contents is sent only to members who need the check, so failure of information transmission is prevented and information can be communicated to all members securely.

In another preferred embodiment, the information list display portion extracts bulletin information that is designated to be provided to the member who logged in based on an ID of the member and displays a list of a plurality of extracted bulletin information in a predetermined priority order. Thus, important information is not buried in a lot of bulletin information and is communicated to each member securely.

In still another preferred embodiment, the information list display portion gives a high priority of the display order and a predetermined mark in the list to bulletin information for which the number of days until the expiration date is smaller than a predetermined value. Thus, a possibility that there is still a member who has not read the information on the expiration date of the bulletin information is decreased, so that information can be communicated to each member securely.

In still another preferred embodiment, the information list display portion gives a high priority of the display order and a predetermined mark in the list to bulletin information to which the information changing portion gave a status indicating "required to check the change" that means contents of the bulletin information is changed. Thus, a possibility that a reader (a member) overlooks a change in contents of the read bulletin information, so that information can be communicated to all members securely.

In still another preferred embodiment, the read state monitoring portion sends automatically a notice of completion to the information sender by electronic mail when all the members have answered the bulletin information. Thus, the information sender can know soon that all members have answered the bulletin information, so the information sender can rely on the automatic process by the bulletin board management system for checking the answer state of each member without worrying.

In still another preferred embodiment, the designating information registered initially by the information registration portion includes a designation of automatic extension of the expiration date, and the expiration date extension confirmation portion performs a process for automatically postponing the expiration date by a predetermined number of days if there is a member who has not answered the bulletin information on the original expiration date. Thus, the information sender can rely on the automatic process by the bulletin board management system for managing the expiration date.

In still another preferred embodiment, a display for reading one bulletin information selected from a list of plural bulletin information displayed by the information list display portion includes buttons corresponding to the choices of answer. Thus, the reader can answer the bulletin information easily. In addition, the information sender can analyze the answer easily by each choice prepared in advance.

In still another preferred embodiment, the information list display portion adds a predetermined mark to bulletin information for the display that is restricted to specific members. Thus, the reader can recognize bulletin information that is restricted to specific members at a first sight, so that a possibility of an unintended leakage of the bulletin information can be decreased.

In still another preferred embodiment, a display for reading one bulletin information selected from a list of plural bulletin information displayed by the information list display portion includes a list of members to be provided with the information and answer states of the members if the bulletin information is restricted to specific members. Thus, the reader can communicate or exchange opinions with members to be provided with the bulletin information without worrying while being careful not to leak the bulletin information to other members who are not provided with the bulletin information.

In addition, a computer program according to the present invention is installed in a server connected to a computer network for realizing a bulletin board management system for communication and information sharing among members. The computer program makes the server execute the process including the steps of registering bulletin information and designating information including members to be provided with the information, choices of answer and an expiration date, by an information sender, making a change to contents of the bulletin information registered by the information sender, extracting bulletin information and displaying a list thereof by a terminal device of a member who logged in, the extracted bulletin information being designated to be provided to the member, monitoring a read state and an answer state of the bulletin information and members, sending automatically a notice by electronic mail to a member who has not answered the bulletin information yet in accordance with the answer state of each member obtained by monitoring the answer state, and sending automatically an electronic mail urging the information sender to postpone the expiration date if there is a member who has not answered the bulletin information whose expiration date is coming soon.

The above-mentioned computer program may be stored in a computer readable recording medium such as a CD-ROM for supply and is installed from the recording medium into a computer (a server) for execution.

BRIEF DESCRIPTION OF THE DRAWINGS

FIG. 3 is a flowchart showing a procedure of registering bulletin information performed by an information sender using a terminal device.

FIGS. 4(a) and 4(b) show examples of a screen displayed on the terminal device by an information registration portion when the information sender registers the bulletin information.

FIGS. 6(a)-6(d) show changes in data contents in each step when a change is made to contents of the bulletin information.

FIGS. 10(a) and 10(b) show an example of bulletin information display in the case where a status of the reader indicates "unanswered" or "required to check the change".

FIG. 11 shows an example of bulletin information display in the case where the status of the reader indicates "already answered".

FIG. 12 shows an example of a notice of completion by electronic mail.

FIGS. 13(a) and 13(b) show an example of bulletin information display in the case where the status of the reader indicates "required to check the change" and the reader is the last answerer.

FIGS. 15(a)-15(d) show examples of data tables that are used in the process shown in FIG. 14.

FIGS. 18(a)-18(e) show examples of data tables that are used in the process shown in FIG. 17.

BEST MODE FOR CARRYING OUT THE INVENTION

The present invention will be described more in detail with reference to the attached drawings.

Figure 1:
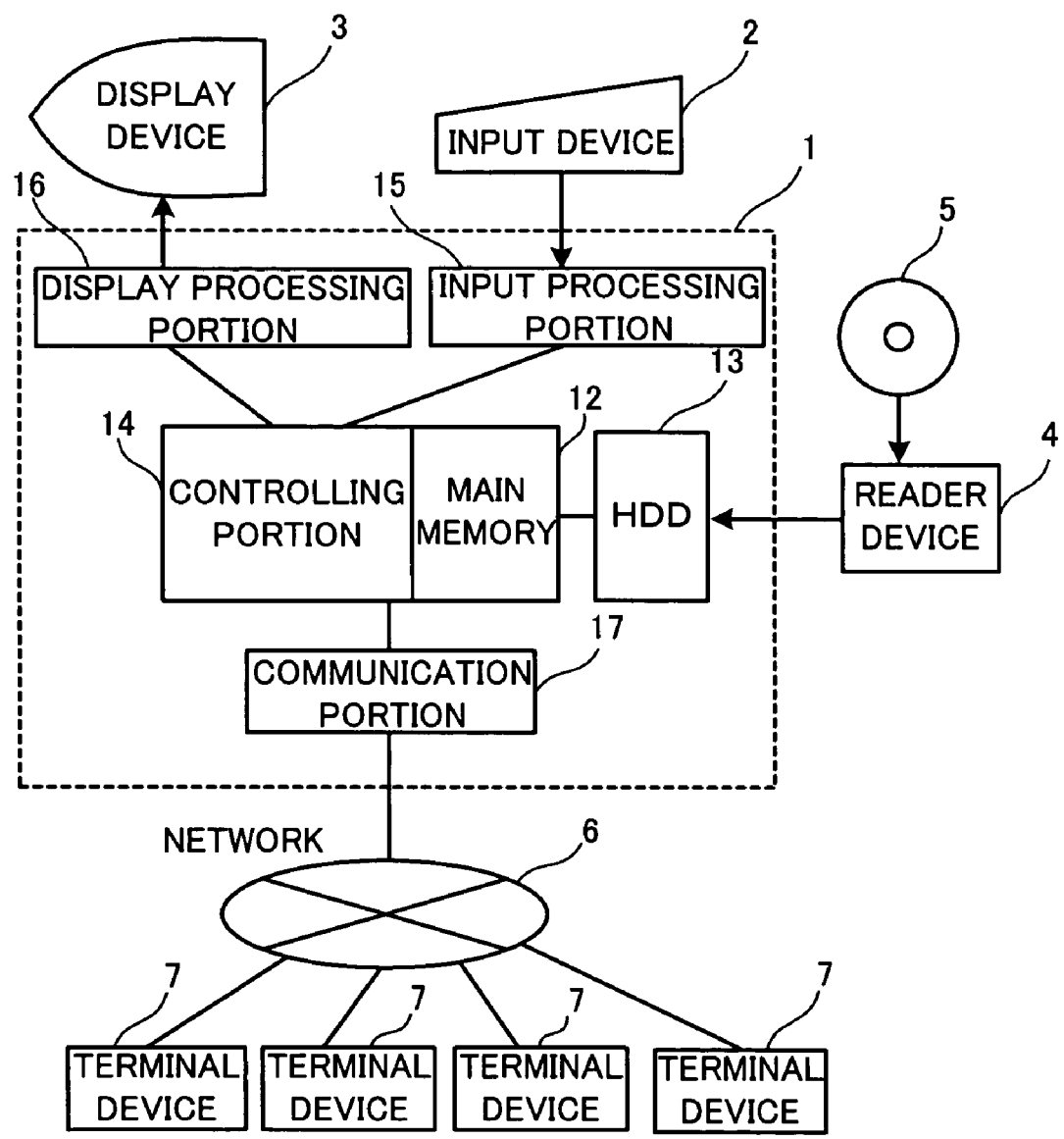
FIG. 1 is a block diagram showing an example of a computer system for realizing a bulletin board management system according to an embodiment of the present invention.

FIG. 1 is a block diagram showing an example of a computer system for realizing a bulletin board management system according to an embodiment of the present invention. The bulletin board management system according to the present invention can be realized by installing a specific program into a computer system such as a personal computer or a workstation. This program for the bulletin board management system is stored in a recording medium 5 such as a CD-ROM (an optical disk) for supply and is installed into an auxiliary storage device (HDD) 13 of the computer (hereinafter referred to as a server) 1 via a reader device 4.

The program for the bulletin board management system installed into the auxiliary storage device 13 is loaded to a main memory 12 and executed by a controlling portion 14. The server 1 includes the main memory 12, the auxiliary storage device 13, the controlling portion 14, an input processing portion 15, a display processing portion 16 and a communication portion 17. The input processing portion 15 is connected to an input device 2 such as a keyboard or a mouse, while the display processing portion 16 is connected to a display device 3 such as a CRT (a cathode ray tube) or an LCD (a liquid crystal display). The communication portion 17 is connected to a network 6 such as the Internet.

The program for the bulletin board management system according to this embodiment is a so-called web program for exchanging information with plural terminal devices 7 connected to the network 6 by using a web browser (a program for reading information). In addition, the web program performs automatic transmission of electronic mail to the terminal device 7 in cooperation with an electronic mail server (a SMTP server). Each of the terminal devices 7 is a personal computer or a mobile terminal having a function for making connection to the network 6, and a web browser for using the bulletin board management system is installed in the terminal device 7.

Figure 2A:
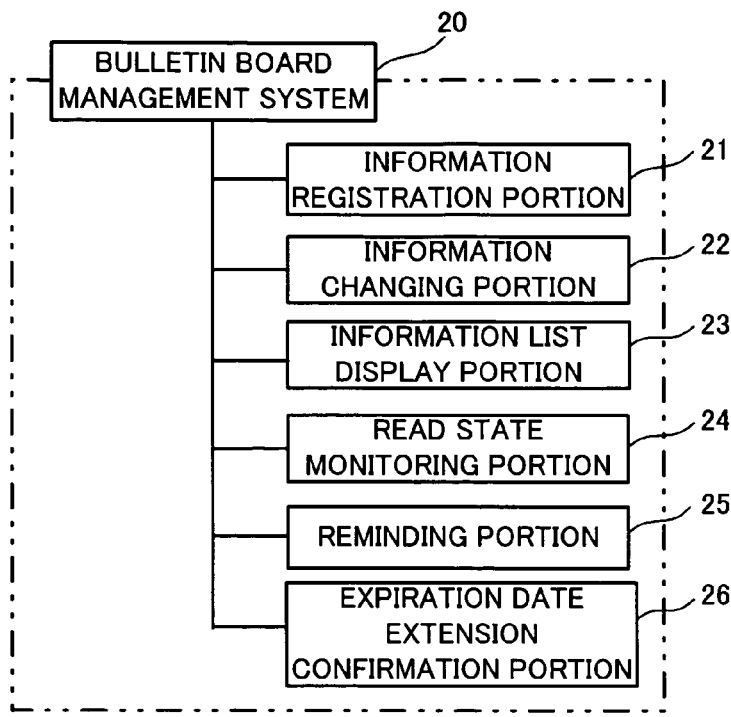
FIGS. 2(a) and 2(b) show a functional structure of the bulletin board management system according to the embodiment and a database.
Figure 2B:
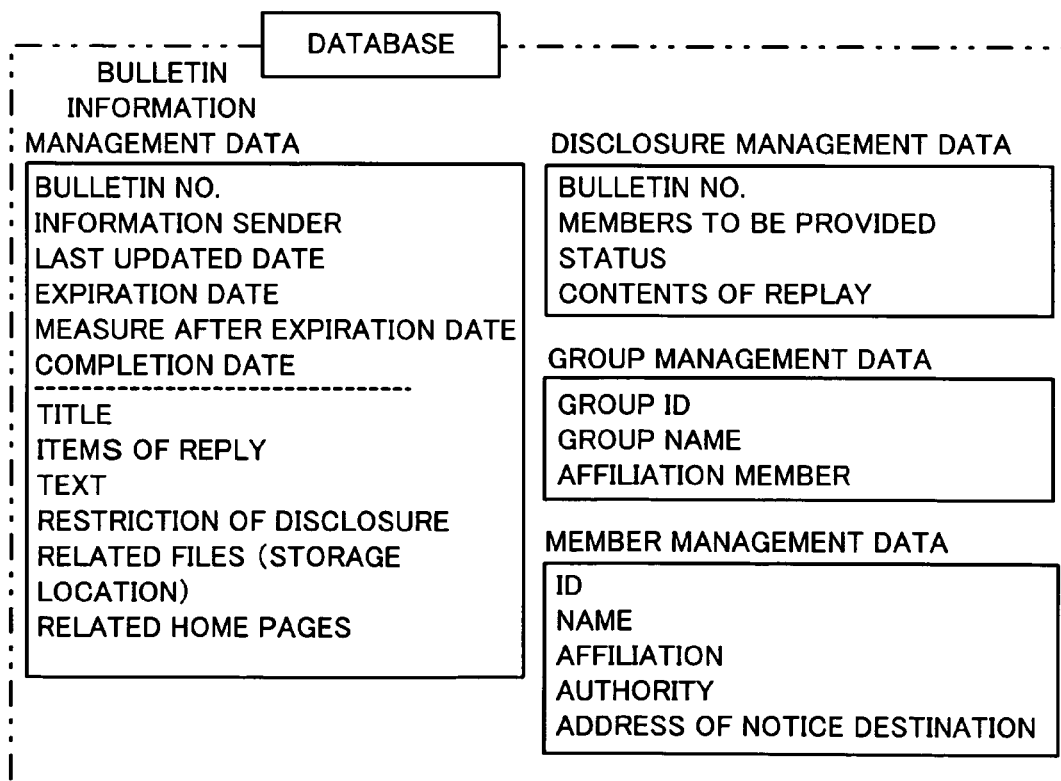

FIGS. 2(a) and 2(b) show a functional structure of the bulletin board management system (a program thereof) according to the embodiment and a database. As shown in FIG. 2(a), this bulletin board management system 20 includes an information registration portion 21, an information changing portion 22, an information list display portion 23, a read state monitoring portion 24, a reminding portion 25 and an expiration date extension confirmation portion 26. These portions are actually realized by the program for the bulletin board management system, and users of the terminal devices 7 can utilize these functions of the server 1 through the web browser. Hereinafter, each "portion" mentioned above may be referred to as a "function".

The information registration portion 21 is a function for an information sender to register bulletin information together with a designation of members to be provided with the information, a designation of choices of answer for an information reader and other designations. The information changing portion 22 is a function for making a change to contents of the bulletin information registered by the information sender. The information list display portion 23 is a function for displaying information registered on the bulletin board so that a user of the terminal device 7 who logged in (hereinafter also referred to as a member) can read the information by the web browser.

The read state monitoring portion 24 is a function for monitoring a read state and an answer state of the bulletin information and members so as to perform an appropriate automatic process. The reminding portion 25 is a function for sending automatically a notice by electronic mail to a member who has not answered the bulletin information yet in accordance with the answer state of each member. The expiration date extension confirmation portion 26 is a function for sending automatically an electronic mail urging the information sender to postpone the expiration date of the bulletin information whose expiration date is coming soon, if necessary.

As shown in FIG. 2(b), databases that are used by the above-mentioned portions include four major categories of databases, which are a bulletin information management database, a disclosure management database, a group management database and a member management database. Each database includes items of data as shown in FIG. 2(b).

FIG. 3 is a flowchart showing a procedure of registering bulletin information performed by an information sender using a terminal device 7. The information sender inputs an ID code and a password in Step #101 for logging in and registers bulletin information having contents as shown in FIG. 4 in Step #102. After the registration is completed, the information sender logs off in Step #103 for finishing the process.

FIGS. 4(a) and 4(b) show examples of a screen displayed on the terminal device 7 by an information registration portion 21 when the information sender registers the bulletin information. As shown in FIG. 4(*a*), a title, items of reply, contents, attached documents, a restriction of disclosure, an expiration date, whether the expiration date is postponed or not, related files, related home pages (web pages) and other information are registered. The items of reply are definitions of buttons that are used by readers of bulletin information for answering as being described later.

If "Yes" is selected for the item "restriction of disclosure", a screen for selecting members to be provided with information as shown in FIG. 4(*b*) is displayed. Here, the information sender marks check boxes of members to be provided with the information. The information will not be provided to other members without marks in the check boxes. When a member to be provided with the information logs in and views the bulletin board, a screen including this information will be displayed. On the contrary, when another member who is not to be provided with the information views the bulletin board in the same manner, this information will not be displayed on the screen.

Figure 5:
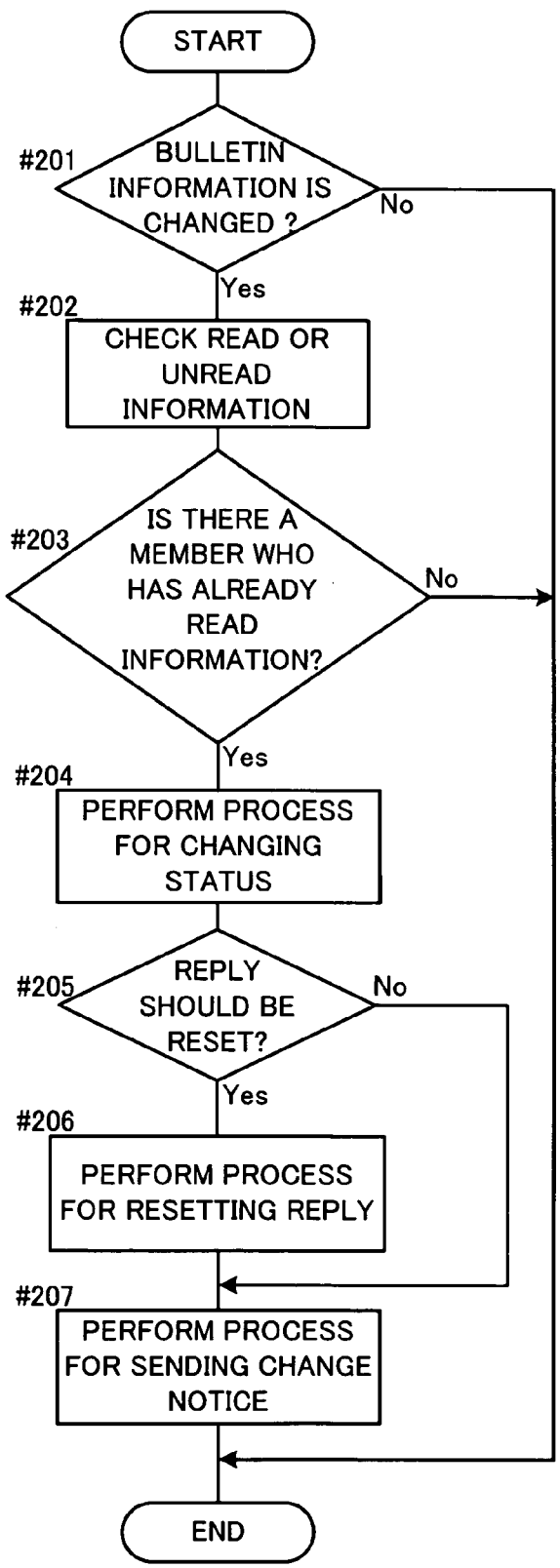
FIG. 5 shows an example of a process performed by an information changing portion when the information sender makes a change to the bulletin information.

FIG. 5 shows an example of a process performed by the information changing portion 22 when the information sender makes a change to the bulletin information. In addition, FIGS. 6(*a*)-6(*d*) show changes in data contents of No. 1 in each step when a change is made to contents of the bulletin information.

When it is detected in Step #201 that the bulletin information is changed, the information changing portion 22 checks read or unread information in Step #202. On this occasion, it is supposed that the read or unread information is in the state as shown in FIG. 6(*a*).

In the next Step #203, it is checked whether or not there is a member who has already read the information. If there is a member who has already read the information, a process for changing a status is performed in the next Step #204. In the example shown in FIG. 6(*a*), there are two members, i.e., ID 05 and ID 10, who have already read the information. The statuses (in read states) of these two members are changed to "required to check the change" as shown in FIG. 6(*b*). If there is no member who has already read the information, this process is finished.

In the next Step #205, it is checked whether the reply of the member to be provided with the information whose status was changed should be reset or not. If the reply should be reset, there is the case where it is not always necessary to reset the reply that was made previously even the changed contents are erased in the next Step #206. This depends on which reply item was registered in the above-described process for registering the bulletin information. If the reply is not reset, Step #206 is skipped.

Finally in Step #207, a process for sending a notice of the change is performed. Namely, the electronic mail having contents like exemplified in FIG. 6(*d*) is automatically sent to target members (two members of ID 05 and ID 10 who are to be provided with the information in the example shown in FIG. 6) via the electronic mail server (the SMTP server).

Figure 7:
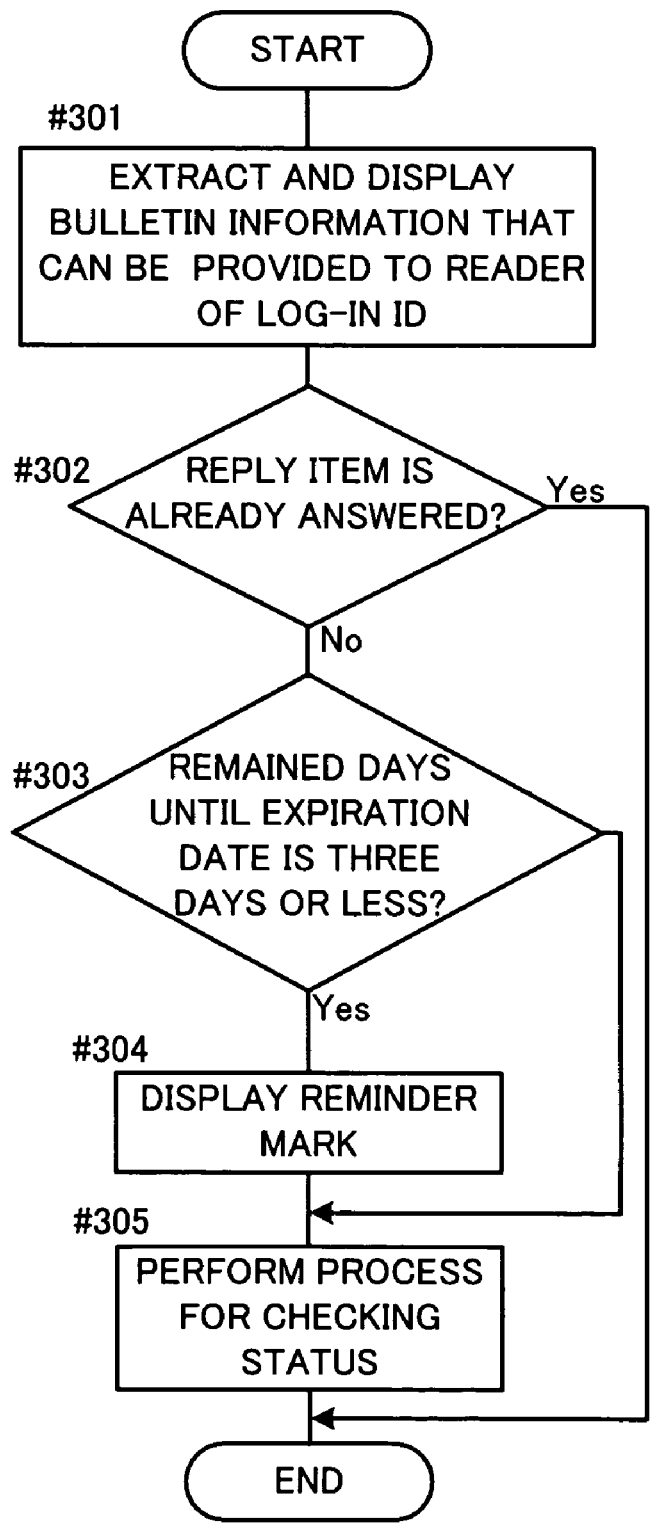
FIG. 7 is a flowchart showing an example of a process performed by an information list display portion when a member logs in and views the bulletin board.
Figure 8:
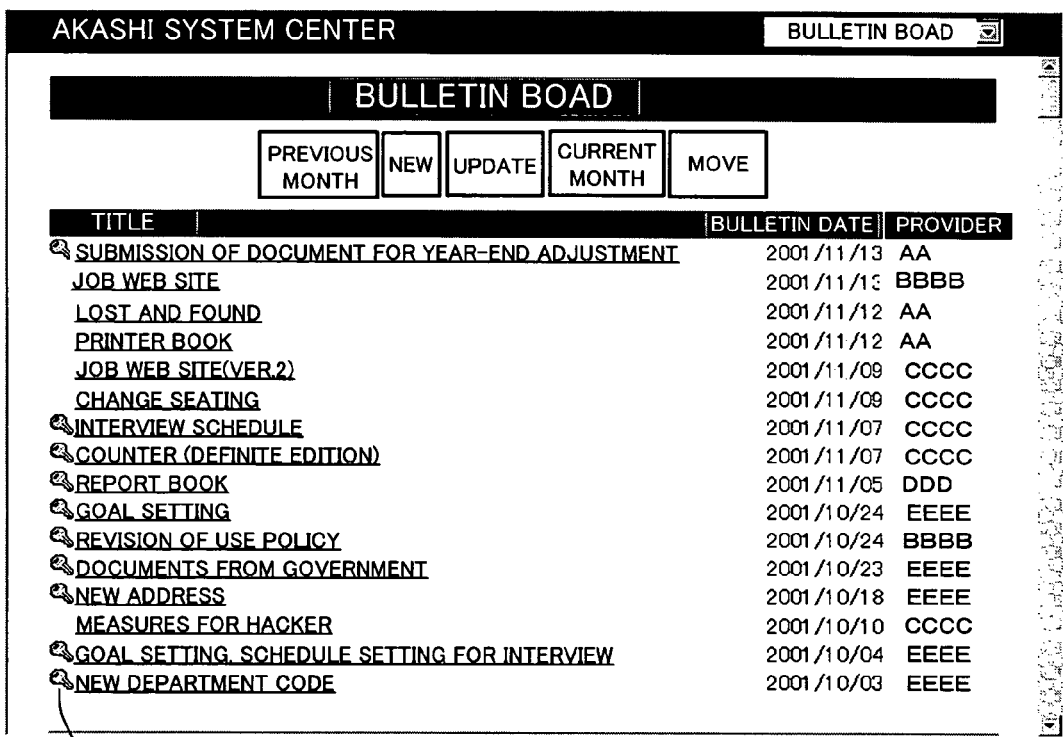
FIG. 8 shows an example of a top screen of a bulletin board displayed on the terminal device of a reader.

FIG. 7 is a flowchart showing an example of a process performed by the information list display portion 23 when a member logs in by entering an ID code and a password and views the bulletin board. In addition, FIG. 8 shows an example of a top screen of a bulletin board displayed on the terminal device 7 of a reader.

In Step #301, the information list display portion 23 extracts bulletin information that can be provided to a reader of a log-in ID and displays the same. Namely, bulletin information, which corresponds to the item of the restriction of disclosure set in the above-described process for registering bulletin information and is checked in the member to be provided with the information, is extracted as bulletin information that can be provided and is included in the list to be displayed. Other bulletin information that is not checked in the member to be provided with the information is not included in the list, so the reader cannot know there is the bulletin information. In addition, as shown in the display example in FIG. 8, bulletin information having the restriction of disclosure has a mark of restriction of disclosure (a key mark) 31 at the left end box of the list.

In the next Step #302, the information list display portion 23 checks whether the reply item of the bulletin information is already answered or not. If it is unanswered, it is checked whether or not the remained days until the expiration date of the bulletin information is three days or less in the next Step #303. If it is three days or less, a reminder mark for reminding an answer is displayed in the left end box of the corresponding bulletin information in the list in the next Step #304. If the remained days until the expiration date are more than three days, Step #304 is skipped. Note that the threshold days for deciding days until the expiration date is not limited to three days but can be set to any number of days. In addition, though the reminder mark is not displayed in the display example shown in FIG. 8, it may be displayed on the right side of the restriction of disclosure mark 31.

In the last Step #305, the information list display portion 23 performs a process for checking a status. As a result, a status mark indicating "not read" or a status mark indicating "required to check the change" is displayed in the left end box of the corresponding bulletin information in the list. Though a status mark is not displayed in the display example shown in FIG. 8, it may be displayed on the right side of the restriction of disclosure mark 31 (or the right side of the reminder mark if it is displayed).

In addition, a display order of bulletin information in the list is dynamically determined in accordance with whether a reminder mark exists or not and with the status mark. For example, bulletin information with a reminder mark is displayed at a position upper than bulletin information without a reminder mark. In addition, bulletin information with the status mark "unread" is displayed at a position upper than bulletin information with the status mark "read". Similarly, bulletin information with the status mark "required to check the change" is display at a further upper position. Alternatively, plural types of marks may be provided which indicate a priority order determined by a combination of whether "reminder" exists or not and contents of "status".

Figure 9:
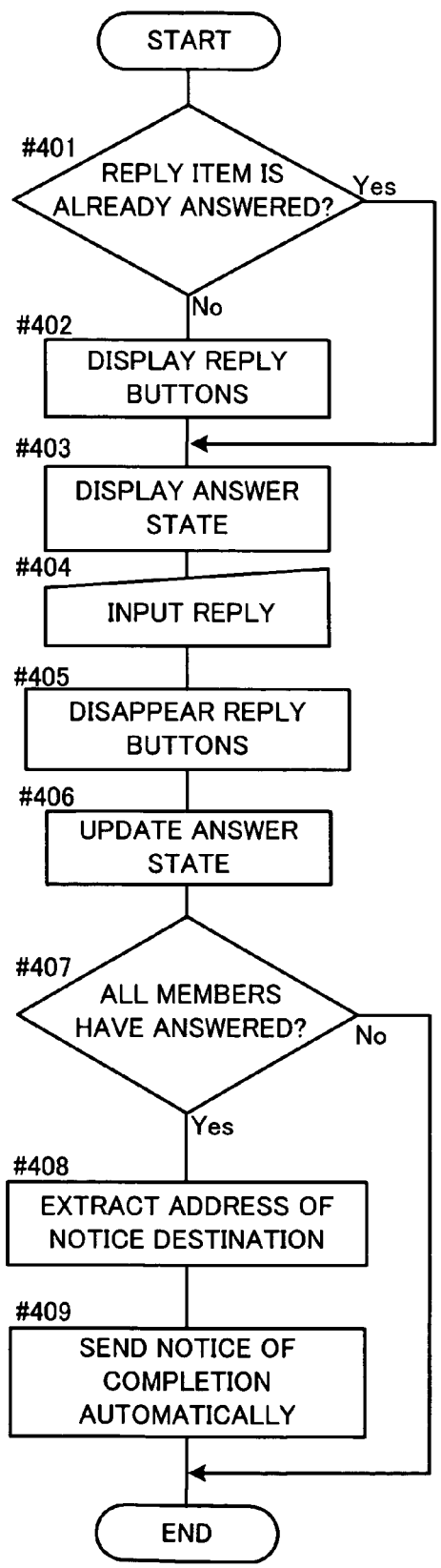
FIG. 9 is a flowchart showing an example of a process performed by a read state monitoring portion.

FIG. 9 is a flowchart showing an example of a process performed by the read state monitoring portion 24. FIGS. 10(*a*) and 10(*b*) show an example of bulletin information display in the case where a status of the reader indicates "unanswered" or "required to check the change". FIG. 11 shows an example of bulletin information display in the case where the status of the reader indicates "already answered". The reader selects one bulletin information in the list exemplified in FIG. 8, so as to view a display of detailed contents of the bulletin information on the screen by the browser's display screen on the terminal device 7 as shown in FIG. 10 or 11.

In Step #401, the read state monitoring portion 24 checks whether the reply item is answered or not. If it is not answered (i.e., in the state "unanswered" or "required to check the change"), reply buttons 33 and 34 are displayed as shown in FIG. 10(*a*) (Step #402). If it is answered, Step #402 is skipped.

Note that a key mark 32 on the left side of a title of the bulletin information in the display example shown in FIG.

10(*a*) indicates that the bulletin information has a restriction of disclosure. In addition, an "answered" button 33 of two reply buttons is an answer button of the previous time. If a status of the reader indicates "required to check the change", the previous answer is valid unless the information sender has reset the reply when changing the bulletin information.

In the next Step #403, the answer state is displayed as shown in the lower part in FIG. 10(*a*). Here, if the reader clicks the mouse (the input device 2) at the lower part of the screen display, a detail of the answer state is displayed as shown in FIG. 10(*b*).

In the next Step #404, when the reader inputs the reply (the answer) by clicking the reply button, the reply buttons disappear from the display as shown in FIG. 11 (Step #405), and the answer state is updated (Step #406). Note that if the status of the reader who logged in is "answered", the display screen of the bulletin information does not include the reply buttons from the beginning as shown in FIG. 11.

In the next Step #407, it is checked whether or not there is no member who has not answered yet (whether or not all members have answered). If all members have answered, an address of the information sender is extracted in the next Step #408, and a notice of completion having contents as exemplified in FIG. 12 is sent by electronic mail automatically.

FIGS. 13(*a*) and 13(*b*) show an example of bulletin information display in the case where the status of the reader indicates "required to check the change" and the reader is the last answerer. In the same way as the display example shown in FIG. 11, the reply buttons are displayed again when the status is changed also in the display example shown in FIG. 13(*a*). In addition, when the reader clicks the mouse at the lower part of the screen display, detail of the answer state is displayed as shown in FIG. 13(*b*).

Figures 14, 16:
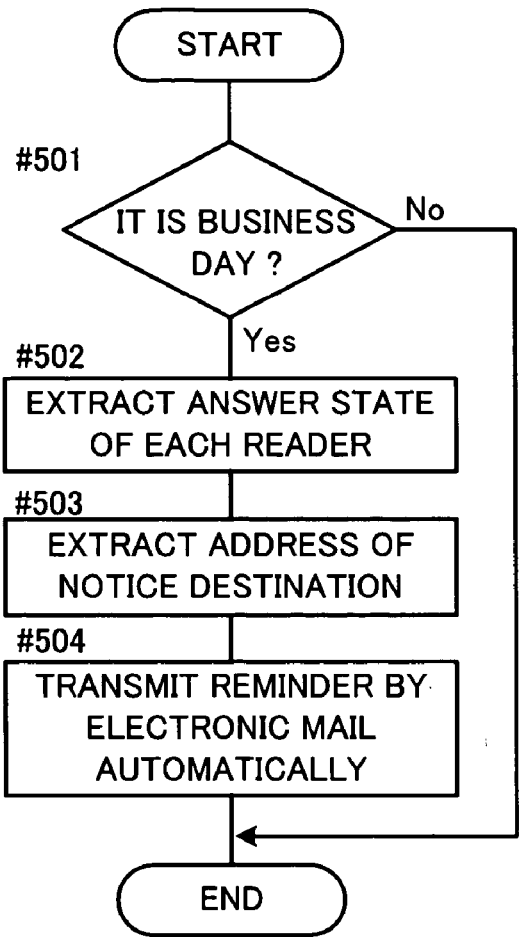
FIG. 14 is a flowchart showing an example of a process performed by a reminding portion.
FIG. 16 shows an example of a notice destination extraction table that is generated in the process shown in FIG. 14.

FIG. 14 is a flowchart showing an example of a process performed by the reminding portion 25. In addition, FIGS. 15(*a*)-15(*d*) show examples of data tables that are used in the process shown in FIG. 14. A member management table shown in FIG. 15(*a*) includes electronic mail addresses (or FAX numbers) of members. FIG. 16 shows an example of a notice destination extraction table that is generated in the process shown in FIG. 14.

The reminding portion 25 checks whether it is a business day or not in Step #501 shown in FIG. 14. If it is not a business day, the process is finished (a reminder process is not performed). If it is a business day, the answer state of each reader (who logged in) is extracted in the next Step #502. This extraction process is performed in accordance with the member management table shown in FIG. 15(*a*), the status management table shown in FIG. 15(*b*) and the bulletin information management table shown in FIG. 15(*c*). As a result, an answer state extracted table is obtained as shown in FIG. 15(*d*).

In the next Step #503, the address of notice destination is extracted. Thus, the notice destination extraction table is obtained as shown in FIG. 16. The reminding portion 25 performs an automatic transmission process of a reminder by electronic mail in accordance with the notice destination table (Step #504).

Figure 17:
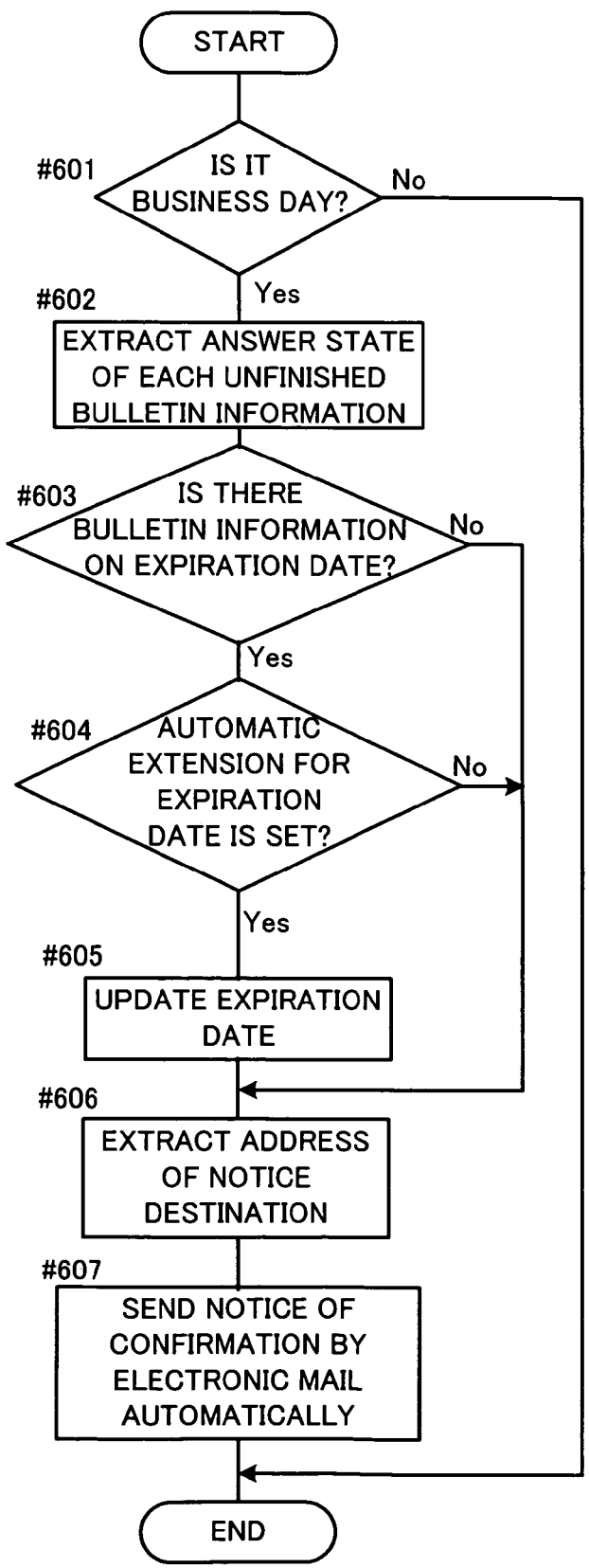
FIG. 17 is a flowchart showing an example of a process performed by an expiration date extension confirmation portion.

FIG. 17 is a flowchart showing an example of a process performed by the expiration date extension confirmation portion 26. In addition, FIGS. 18(*a*)-18(*e*) show examples of data tables that are used in the process shown in FIG. 17.

The expiration date extension confirmation portion 26 checks whether it is a business day or not in Step #601 shown in FIG. 17. If it is not a business day, the process is finished (a process for confirming extension of the expiration date is not performed). If it is a business day, the answer state of each unfinished bulletin information is extracted in the next Step #602. This extraction process is performed by using the member management table shown in FIG. 15(*a*), the status management table shown in FIG. 18(*a*) and the bulletin information management table shown in FIG. 18(*b*). As a result, the answer state extracted table is obtained as shown in FIG. 18(*c*). In this case, if there are three or less days until the expiration date, an asterisk is added to a reminder box.

In the next Step #603, it is checked whether there is bulletin information on the expiration date or not. If there is bulletin information on the expiration date, it is checked in the next Step #604 whether an automatic extension for the expiration date is set or not. This setting means one that was registered initially on the registration screen of the bulletin information shown in FIG. 4(*a*). If the automatic extension is set, the expiration date is updated (the automatic extension is performed) in the next Step #605. A period that is added for the extension is a predetermined period (a week, for example). If the automatic extension is not set, Step #605 is skipped. In addition, if there is no bulletin information on the expiration date in Step #603, Steps #604 and #605 are skipped.

In the next Step #606, an address of the information sender is extracted. As a result, the notice destination extraction table is obtained as shown in FIG. 18(*d*). Finally, the expiration date extension confirmation portion 26 performs a process for sending automatically a notice of confirming extension of the expiration date by electronic mail in accordance with this notice destination extraction table as shown in FIG. 18(*e*) (Step #607). The electronic mail for confirming extension of the expiration date shown in FIG. 18(*e*) is an example in the case where the automatic extension of the expiration date is not set. It is necessary to change the final line thereof in accordance with set contents in the initial registration described above.

Though an embodiment of the present invention is described above, the present invention is not limited to the embodiment and can be embodied in various ways. For example, instead of electronic mail for sending a notice automatically by each portion, an automatic transmission function of a facsimile may be used. Alternatively, the notice may be performed by telephone with speech synthesis.

The invention claimed is:

1. A bulletin board management system for providing a site for communication and information sharing among members by utilizing a computer network, the system comprising:
   a memory storing portions for execution, comprising:
      an information registration portion for an information sender to register bulletin information on a bulletin board and further register designating information corresponding to the bulletin information, the designating information including a first item indicating an expiration date, a second item indicating whether or not the expiration date can be postponed, and a third item indicating whether or not disclosure of the bulletin information is restricted, and further including, only if the third item indicates that the disclosure of the bulletin information is restricted, a fourth item indicating options to be selected as a reply and a fifth item indicating members who are allowed to view the bulletin information and who are requested to answer the fourth item;
      an information list display portion for extracting and displaying, in a list form, on a terminal device of a member who logged in, bulletin information for which the third item indicates that the disclosure of the bulletin information is not restricted, and at the same time bulletin information for which the fifth item includes the member who has logged in and who is requested to answer the fourth item;

a read state monitoring portion for checking whether or not the bulletin information has been read and whether or not there is a reply by the member resulting from answering the fourth item;

an information changing portion that makes a change to contents of the bulletin information registered by the information sender, and, if the third item indicates that the disclosure of the bulletin information is restricted, extracts a member who has read the bulletin information before the change from a result obtained by the read state monitoring portion, and if the member who has read the bulletin information before the change is extracted, changes a status of the member who has been extracted as having read the bulletin information from a status indicating "already read" to a status indicating "required to check the change", resets the reply of the member who has read the bulletin information in accordance with contents of the fourth item, and automatically sends electronic mail urging the member who has read the bulletin information to check the change in content of the bulletin information;

a reminding portion for automatically sending a reminder by electronic mail to a member who has not answered, in accordance with whether or not there is a reply by each member obtained by the read state monitoring portion; and an expiration date extension confirmation portion for automatically sending electronic mail to the information sender urging the information sender to postpone the expiration date if there is a member who has not answered the fourth item for the bulletin information whose expiration date is coming soon.

2. The bulletin board management system according to claim 1, wherein the information list display portion extracts, based on an ID of the member who logged in, bulletin information for which the fifth item includes the member who has logged in, and displays a plurality of pieces of bulletin information extracted in a list form in a predetermined priority order.

3. The bulletin board management system according to claim 2, wherein the information list display portion gives a high priority display order to bulletin information that has a number of days remaining until the expiration date fewer than a predetermined number of days, and displays the bulletin information with a predetermined mark attached thereto.

4. The bulletin board management system according to claim 2, wherein the information list display portion gives a high priority display order to bulletin information to which the status indicating "required to check the change" is given, and displays the bulletin information with a predetermined mark attached thereto, the status indicating "required to check the change" meaning that contents of the bulletin information have been changed by the information changing portion.

5. The bulletin board management system according to claim 3, wherein the information list display portion gives a high priority display order to bulletin information to which the status indicating "required to check the change" is given, and displays the bulletin information with a predetermined mark attached thereto, the status indicating "required to check the change" meaning that contents of the bulletin information have been changed by the information changing portion.

6. The bulletin board management system according to claim 1, wherein the read state monitoring portion automatically sends a notice of completion to the information sender by electronic mail when all the members have answered the fourth item.

7. The bulletin board management system according to claim 1, wherein the expiration date extension confirmation portion performs a process for automatically postponing the expiration date by a predetermined number of days if there is a member who has not answered the fourth item for the bulletin information of which the expiration date indicated in the first item coincides with a current date.

8. The bulletin board management system according to claim 1, wherein a display for viewing one piece of one bulletin information selected from among a plurality of pieces of bulletin information displayed in a list form by the information list display portion includes buttons corresponding to the fourth item.

9. The bulletin board management system according to claim 1, wherein the information list display portion adds a predetermined mark to bulletin information for which the third item indicates that the disclosure of the bulletin information is restricted, and displays the bulletin information with the predetermined mark attached thereto.

10. The bulletin board management system according to claim 1, wherein a display for viewing one piece of bulletin information selected from among a plurality of pieces of bulletin information displayed in a list form by the information list display portion includes a list of members who are allowed to view the one piece of bulletin information and a state indicating an answer by each of the members to the fourth item if the third item indicates that disclosure of bulletin information is restricted for the one piece of bulletin information.

11. A method for communication and information sharing among members, comprising:

registering, in a server, by an information sender, bulletin information on a bulletin board and further registering designating information corresponding to the bulletin information, the designating information including a first item indicating an expiration date, a second item indicating whether or not the expiration date can be postponed, and a third item indicating whether or not disclosure of the bulletin information is restricted, and further including, only if the third item indicates that the disclosure of the bulletin information is restricted, a fourth item indicating options to be selected as a reply and a fifth item indicating members who are allowed to view the bulletin information and who are requested to answer the fourth item;

making a change to contents of the bulletin information already registered by the information sender;

extracting and displaying, in a list form, on a terminal device of a member who logged in, bulletin information for which the third item indicates that the disclosure of the bulletin information is not restricted, and at the same time bulletin information for which the fifth item includes the member who has logged in and who is requested to answer the fourth item;

checking whether or not the bulletin information has been read and whether or not there is a reply by the member who answered the fourth item;

sending automatically a reminder by electronic mail to a member who has not answered, in accordance with a result obtained by the checking on each member;

sending automatically electronic mail to the information sender urging the information sender to postpone the expiration date if there is a member who has not answered the fourth item for the bulletin information whose expiration date is coming soon;

extracting, if the third item indicates that the disclosure of the bulletin information is restricted, a member who has read the bulletin information before the change, based on a result obtained by the checking; and if the member who has read the bulletin information before the change is extracted, resetting, in accordance with contents of the fourth item, the reply of the member who has read the bulletin information, sending automatically electronic mail to the member who has read the bulletin information to urge the member to check the change in content of the bulletin information, and changing a status of the member who has been extracted from a status indicating "already read" to a status indicating "required to check the change".

12. A computer readable recording medium that stores a computer program that is installed in a server connected to a computer network for realizing a bulletin board management system for communication and information sharing among members, the computer program makes the server execute the process comprising:

registering, by an information sender, bulletin information on a bulletin board and farther registering designating information corresponding to the bulletin information, the designating information including a first item indicating an expiration date, a second item indicating whether or not the expiration date can be postponed, and a third item indicating whether or not disclosure of the bulletin information is restricted, and farther including only if the third item indicates that the disclosure of the bulletin information is restricted, a fourth item indicating options to be selected as a reply and a fifth item indicating members who are allowed to view the bulletin information and who are requested to answer the fourth item;

making a change to contents of the bulletin information already registered by the information sender;

extracting and displaying, in a list form, on a terminal device of a member who logged in, bulletin information for which the third item indicates that the disclosure of the bulletin information is not restricted, and at the same time bulletin information for which the fifth item includes the member who has logged in and who is requested to answer the fourth item;

checking whether or not the bulletin information has been read and whether or not there is a reply by the member who answered the fourth item;

sending automatically a reminder by electronic mail to a member who has not answered, in accordance with a result obtained by the checking on each member;

sending automatically electronic mail to the information sender urging the information sender to postpone the expiration date if there is a member who has not answered the fourth item for the bulletin information whose expiration date is coming soon;

extracting, if the third item indicates that the disclosure of the bulletin information is restricted, a member who has read the bulletin information before the change, based on a result obtained by the checking; and if the member who has read the bulletin information before the change is extracted, resetting, in accordance with contents of the fourth item, the reply of the member who has read the bulletin information, sending automatically electronic mail to the member who has read the bulletin information to urge the member to check the change in content of the bulletin information, and changing a status of the member who has been extracted from a status indicating "already read" to a status indicating "required to check the change".

* * * * *

UNITED STATES PATENT AND TRADEMARK OFFICE
CERTIFICATE OF CORRECTION

PATENT NO. : 7,668,909 B2
APPLICATION NO. : 10/954198
DATED : February 23, 2010
INVENTOR(S) : Hiroyuki Nambu et al.

It is certified that error appears in the above-identified patent and that said Letters Patent is hereby corrected as shown below:

Column 10, Line 46, change "portions" to --portion--.

Column 11, Line 27, change "answered ," to --answered,--.

Column 13, Line 24, change "farther" to --further--.

Column 13, Line 30, change "farther" to --further--.

Signed and Sealed this

Eighteenth Day of May, 2010

David J. Kappos
*Director of the United States Patent and Trademark Office*